(12) United States Patent
Oliver

(10) Patent No.: US 6,390,253 B1
(45) Date of Patent: May 21, 2002

(54) MAGNETO-RHEOLOGICAL DAMPING APPARATUS

(75) Inventor: Michael Leslie Oliver, Xenia, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/412,141

(22) Filed: Oct. 5, 1999

(51) Int. Cl.$^7$ ................................................. F16F 9/53
(52) U.S. Cl. ........................... 188/267.2; 188/322.15; 188/322.22
(58) Field of Search .................... 188/267, 267.1, 188/267.2, 322.17, 322.19, 322.15, 322.22, 281, 316; 267/140.14, 140.15

(56) References Cited

U.S. PATENT DOCUMENTS

| | | | |
|---|---|---|---|
| 2,661,596 A | | 12/1953 | Winslow |
| 3,207,269 A | | 9/1965 | Klass |
| 3,627,348 A | * | 12/1971 | Klees ..................... 267/64.26 |
| 4,828,230 A | * | 5/1989 | Steger et al. ............ 267/64.16 |
| 5,277,281 A | | 1/1994 | Carlson et al. ............. 188/167 |
| 5,293,969 A | * | 3/1994 | Yamaoka et al. ....... 188/267 X |
| 5,501,438 A | * | 3/1996 | Handke et al. ............. 267/226 |
| 5,632,361 A | | 5/1997 | Wulff et al. ................ 188/167 |
| 5,878,851 A | | 3/1999 | Carlson et al. |
| 5,947,238 A | * | 9/1999 | Jolly et al. ............... 188/267.1 |
| 6,131,709 A | * | 10/2000 | Jolly et al. ............... 188/267.2 |

FOREIGN PATENT DOCUMENTS

WO 98/00653 1/1998

OTHER PUBLICATIONS

W.I. Kordonsky, "Magnetorheological Effect As A Base Of New Devices and Technologies", Journal of Magnetism and Magnetic Materials, 122 (1993), pp. 396–397.
Advertisment for MagneShock™, "MagneShock™ Scores First Race Win!", Jun. 1999.

\* cited by examiner

*Primary Examiner*—Pam Rodriquez
(74) *Attorney, Agent, or Firm*—Robert M. Sigler

(57) ABSTRACT

The present invention provides a magneto-rheological controlled damping assembly that eliminates contact between the piston and the damping cylinder and that maintains a constant volume for the magneto-rheological fluid within the damping cylinder, therefore substantially reducing abrasion and wear to the damping apparatus components and increasing the performance and the life of the damping apparatus. The magneto-rheological damping apparatus includes a cylinder, having an MR fluid chamber portion containing a magneto-rheological fluid therein; a piston rod extending concentrically within the MR fluid chamber portion of the cylinder, where the piston rod is axially slidable with respect to the cylinder; a piston mounted on the piston rod and positioned within the MR fluid chamber portion of the cylinder, where a radial gap is formed between the piston and the MR fluid chamber portion of the cylinder so as to provide a flow path for the magneto-rheological fluids; a pair of rod guides positioned on opposite ends of the MR fluid portion of the cylinder, where the piston rod extends through and is supported by both rod guides; and a solenoid, operatively coupled to a current supply for generating a magnetic flux in the radial gap, thereby controlling the viscosity of the magneto-rheological fluid in the flow path.

3 Claims, 4 Drawing Sheets

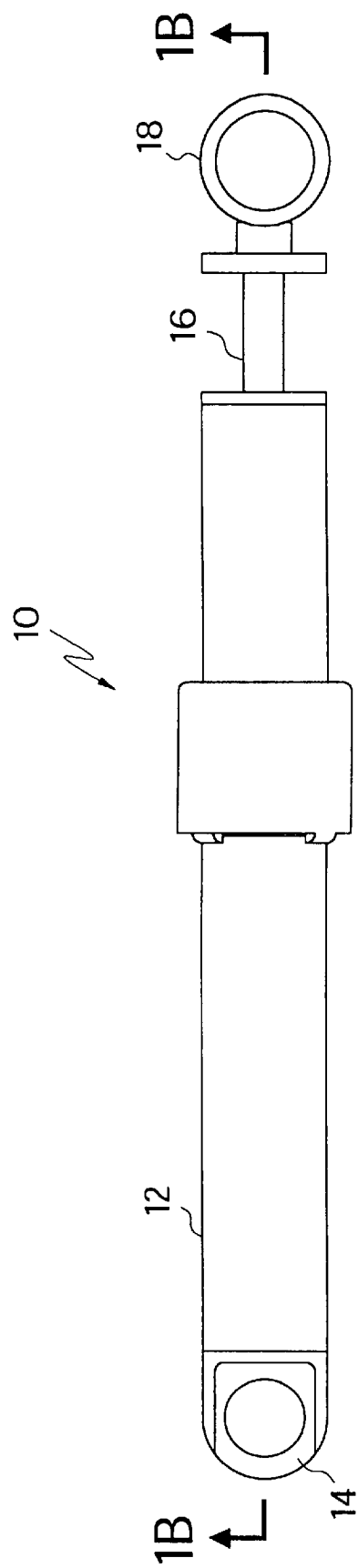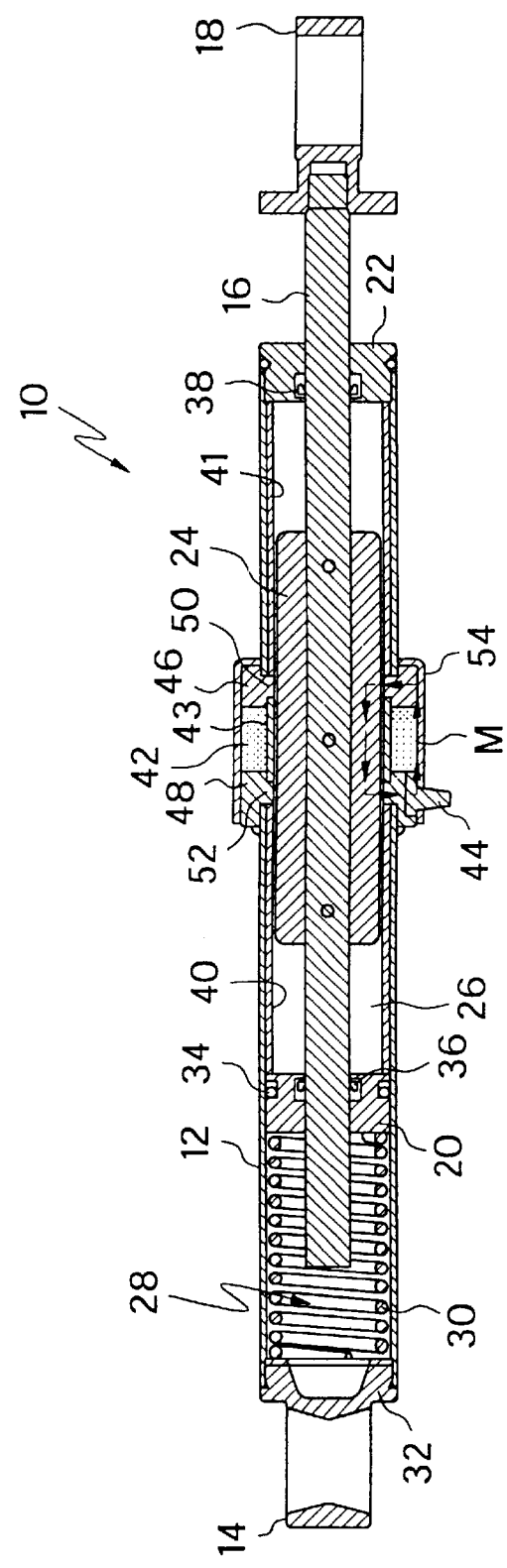
FIG. 1A
FIG. 1B

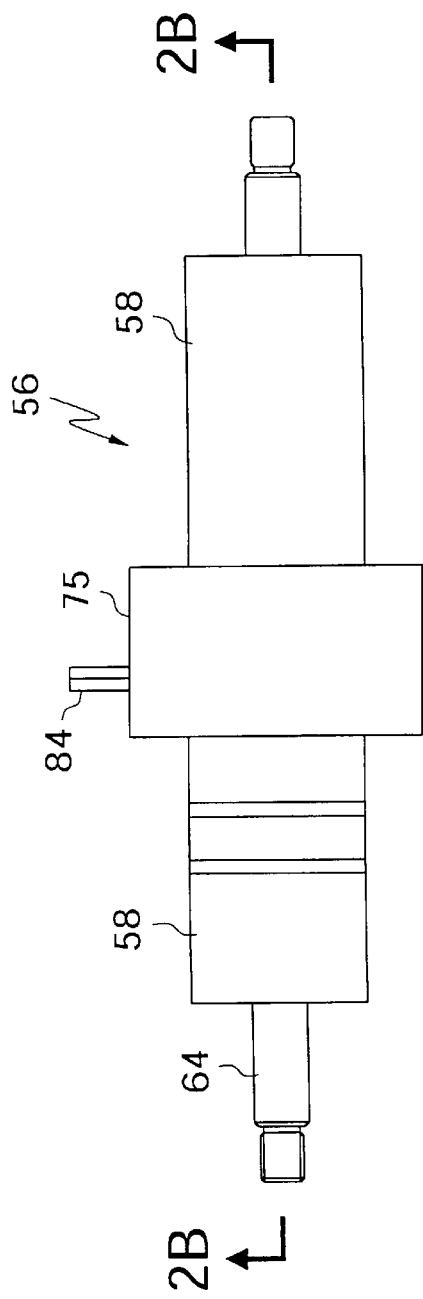
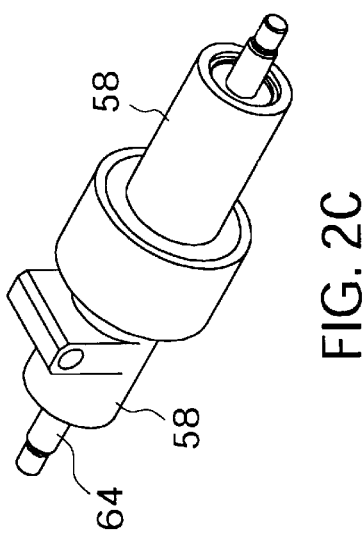
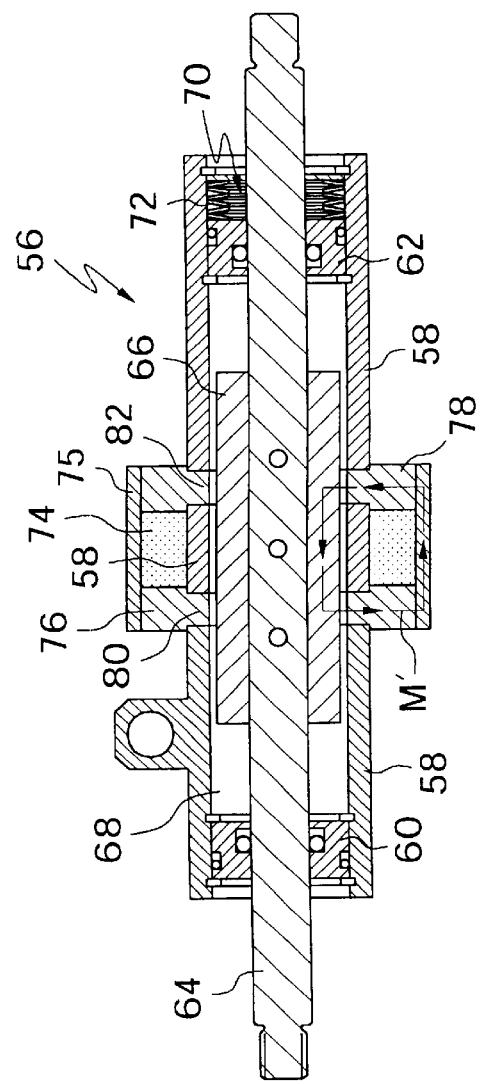
FIG. 2A
FIG. 2B
FIG. 2C

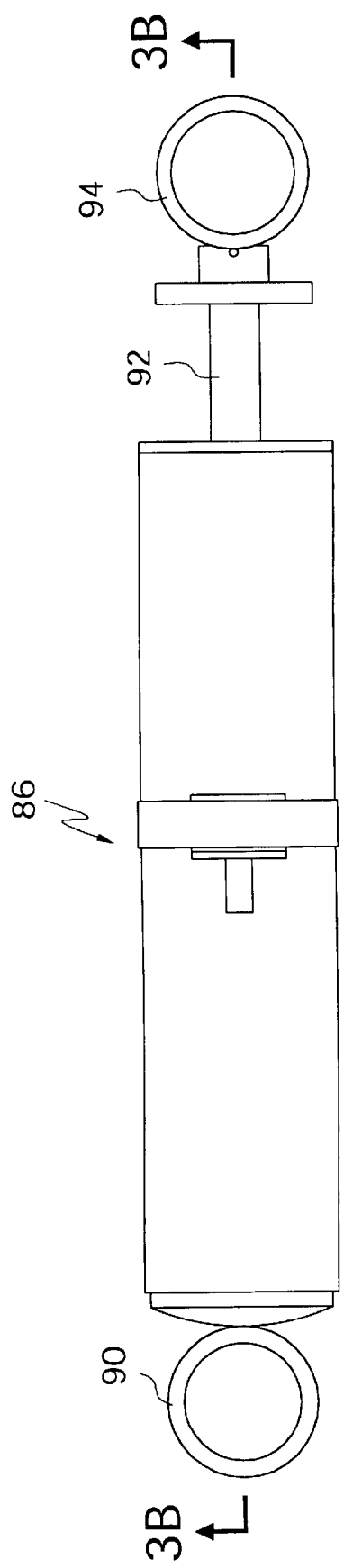
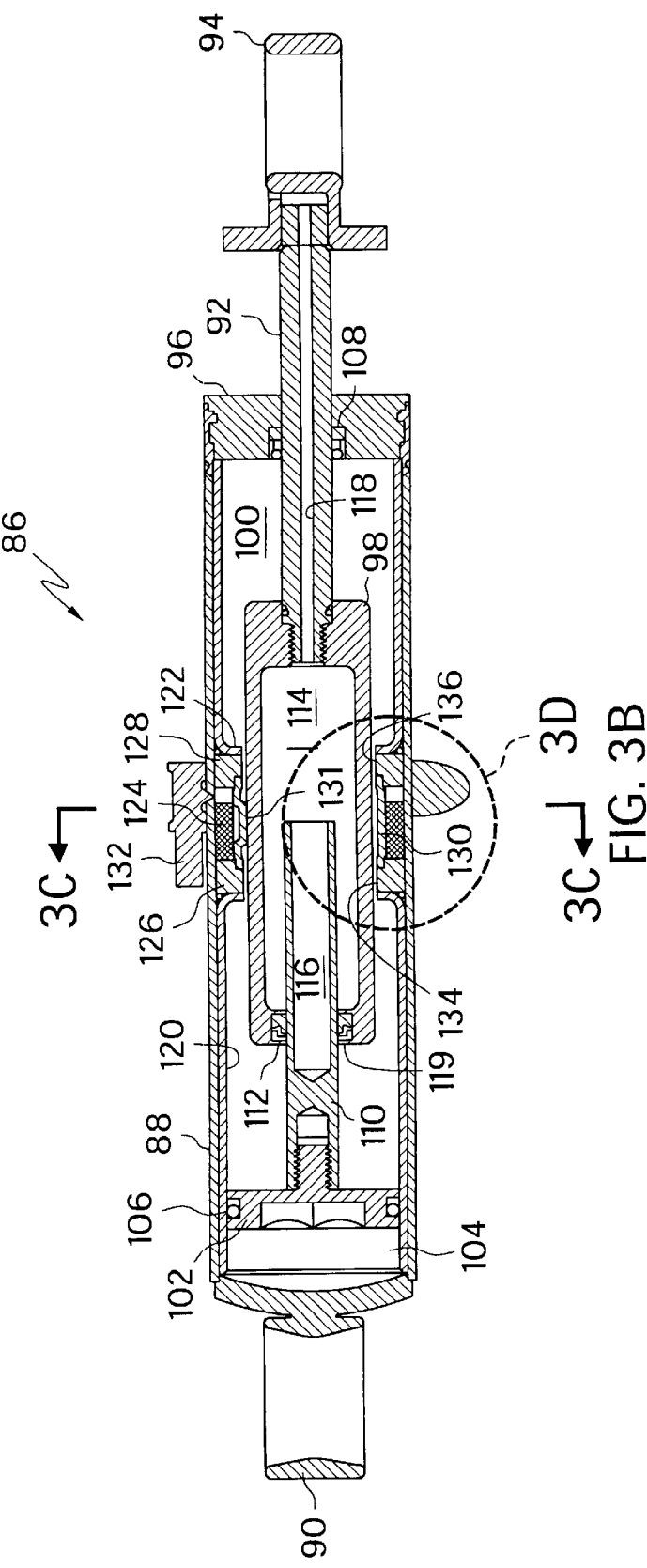

MAGNETO-RHEOLOGICAL DAMPING APPARATUS

TECHNICAL FIELD

The present invention relates to shock absorbers and damping apparatuses, and more particularly, to a magneto-rheological damping apparatus for use in an automotive suspension system.

BACKGROUND OF THE INVENTION

Automobiles and other vehicles utilize shock absorbers to dissipate shock forces sustained by the vehicle wheels. Similar damping apparatuses, such as body dampers, cab dampers, engine dampers and steering dampers are used in other parts of the vehicle. Conventional linear style shock absorbers include a pair of telescoping cylindrical sleeves oriented generally vertically in the vehicle. A piston associated with one of the sleeves travels in a fluid filled cylinder associated with the sleeve. One end of the shock absorber is coupled to a wheel support structure and the other end is fixed to the body, or frame of the vehicle. When a shock force displaces one of the vehicle wheels upwardly, the force drives the piston along the cylinder, thereby driving fluid through an orifice in the piston, which resists such motion with a force proportional to the shock force.

Monotube type dampers typically include a hollow cylinder, a rod guide positioned at one end of the cylinder, a piston rod extending through the rod guide and into the cylinder, a piston positioned on the piston rod within the cylinder, and a gas cup between the piston and the other end of the cylinder. The piston assembly separates a compression chamber from a rebound chamber within the cylinder. The rebound chamber and the compression chamber are normally filled with a hydraulic fluid, and the piston assembly typically includes a rebound stroke valve and compression stroke valve for controlling the flow of fluid between the rebound chamber and the compression chamber.

The gas cup separates a gas chamber at the end of the cylinder from the hydraulic fluid. The gas chamber compensates for internal volume changes due to rod stroking and thermal expansion, and is pressurized to prevent cavitation of the hydraulic fluid during stroking.

Recently, monotube damper assemblies have been developed that utilize magnetic theological components to control the viscosity of the hydraulic fluids passing through the passages in the piston. In such an apparatus, the piston is formed of a ferrous material having a solenoid positioned therein to produce a magnetic flux around the piston, where the magnetic rheological fluid passing through the passages of the piston will be affected by the magnetic flux created by the solenoid. Therefore, by controlling the current in the solenoid, the viscosity of the MR fluid passing though the piston valves can be controlled so as to, in turn, control the damping force of the damping assembly.

A disadvantage with such monotube-type dampers is that, because the piston rod is only supported by a single rod guide positioned at one end of the damping cylinder, the piston may contact and abrade against the interior of the damping cylinder if sufficient transverse force is applied to the piston rod. This may eventually cause the performance of the damping apparatus to degrade. Furthermore, with an internally pressurized design in which inward rod stroking increases the volume to which pressure is applied, the installed damper will always exert a force in such a manner as to extend the rod out of the damper.

Another disadvantage with conventional MR dampers is that the positioning of the solenoid within the piston requires complicated electrical connections, as well as complicated fluid channels, valves and associated seals within the piston. Furthermore, if any of these internal seals should fail, the MR fluid may contact the solenoid and cause shorts therein.

Therefore, a need exist for a monotube-type damping assembly in which the contact between the piston and the interior surfaces of the damping cylinder is substantially eliminated. There is also a need for a monotube-type damping assembly in which the available volume within the damping cylinder remains substantially constant. Finally, there is a need for an MR damping assembly having substantially reduced complexity, where the solenoid is isolated from the MR fluid.

SUMMARY OF THE INVENTION

The present invention provides a magneto-rheological controlled damping assembly that substantially eliminates contact between the piston and the damping cylinder and that maintains a constant volume for the magneto-rheological fluid within the damping cylinder, therefore substantially reducing abrasion and wear to the damping apparatus components and increasing the performance and the life of the damping apparatus. while the damping assembly is preferably used as a vehicle shock absorber, body damper, cab damper, engine damper, steering damper and the like; it is within the scope of the invention to utilize the damping assembly in non-vehicle applications as well.

In one aspect of the present invention a magneto-rheological damping apparatus includes a hollow cylinder having an MR fluid chamber portion containing a magneto-rheological fluid. A piston rod extends concentrically within the MR chamber portion of the cylinder; and a piston is mounted on the piston rod and positioned within the MR fluid chamber portion of the cylinder, where a radial gap is formed between the piston and the MR chamber portion of the cylinder so as to provide a flow path for the magneto-rheological fluid. A solenoid, operatively coupled to a current supply, is mounted around the cylinder outside the MR fluid chamber portion thereof for generating a magnetic flux in the radial gap and thereby controlling the viscosity of the magneto-rheological fluid in the flow path. Because the solenoid is positioned outside the damping cylinder, the solenoid is isolated from the magneto-rheological fluid; and this eliminates any chance that the metal particles entrained in the MR fluid will contact the solenoid and thus cause shorts to the solenoid. Furthermore, because the solenoid is positioned outside the damping cylinder, electrical connections to the solenoid are relatively simplified.

In one embodiment, the apparatus includes a pair of rod guides positioned on opposite ends of the MR fluid portion of the cylinder so that the piston rod extends through and is supported by both rod guides. Therefore, the piston will be prevented from contacting the inner surface of the damping cylinder. In another embodiment, the apparatus includes a single rod guide, positioned on a first end of the cylinder, slidably supporting the piston rod thereon, and includes a secondary rod extending axially into the MR fluid chamber from the opposite end of the cylinder, where the piston includes an axial channel that receives the secondary rod therein. In either of these embodiments, the volume for the MR fluid within the damping cylinder will remain substantially constant.

In another aspect of the present invention a magneto-rheological damping apparatus includes a cylinder having an MR fluid chamber portion containing a magneto-rheological fluid. A piston rod extends concentrically within the MR fluid chamber portion of the cylinder and is axially slidable with respect to the cylinder. A piston is mounted on the piston rod and positioned within the MR fluid chamber portion of the cylinder; and a radial gap is formed between the piston and the MR fluid chamber portion of the cylinder so as to provide a flow path for the magneto-rheological fluids. A pair of rod guides are positioned on opposite ends of the MR fluid portion of the cylinder; and the piston rod extends through and is supported by both rod guides. A solenoid is operatively coupled to a current supply for generating a magnetic flux in the radial gap and thereby controlling the viscosity of the magneto-rheological fluid in the flow path.

Because the piston rod extends completely through the MR fluid chamber portion of the damping cylinder, the volume for the MR fluid within the damping cylinder remains substantially constant, thereby substantially reducing the forces exerted by the piston rod during operation. In addition, because the piston rod is supported by rod guides on both ends of the damping cylinder, the piston will be substantially prevented from contacting the inner surface of the damping cylinder so as to prevent abrasions and degradation of the damping apparatus components. Furthermore, because the solenoid is positioned outside the damping cylinder, electrical connections to the solenoid are simplified, complex valves and seals within the piston are no longer needed, and the solenoid is isolated from the MR fluid.

In yet another aspect of the present invention, a magneto-rheological damping apparatus includes: a cylinder with an MR fluid chamber portion containing a magneto-rheological fluid. A piston rod extends concentrically within the MR fluid chamber portion of the cylinder and is axially slidable with respect to the cylinder. A piston is mounted on the piston rod and positioned within the MR fluid chamber portion of the cylinder, and a radial gap is formed between the piston and the MR fluid chamber portion of the cylinder so as to provide a flow path for the magneto-rheological fluids. A rod guide positioned on a first end of the cylinder slidably supports the piston rod; and a secondary rod extends axially into the MR fluid chamber portion of the cylinder from a second end of the cylinder and is slidably received in an axial channel of the piston. A solenoid is operatively coupled to a current supply for generating a magnetic flux in the radial gap and thereby controlling the viscosity of the magneto-rheological fluid in the flow path.

The piston slides back and forth over the secondary rod as the piston and piston rod move back and forth in the MR fluid chamber in response to vibrations experienced by the damping apparatus. The axial extent of piston movement over the secondary rod will equal the additional length of the piston rod extending into the MR fluid chamber. Therefore, the volume of the MR chamber taken up by the secondary rod and piston rod (if provided with the same diameters) will remain constant. In turn, the volume for the MR fluid within the damping cylinder will remain substantially constant, thereby substantially reducing the forces exerted by the piston rod during operation. Furthermore, because the solenoid is positioned outside the damping cylinder, electrical connections to the solenoid are simplified, complex valves and seals within the piston are no longer needed, and the solenoid is isolated from the MR fluid.

While the above-described embodiments employ the use of MR fluid and solenoids, it is within the scope of the present invention to utilize the through-rod or secondary rod configurations of the present invention with more standard damping arrangements. Thus, it is within the scope of the present invention to provide a damping apparatus that includes a substantially hollow cylinder having a fluid chamber portion containing a damping fluid, a piston rod extending concentrically within the fluid chamber portion of the cylinder and axially slidable with respect to the cylinder, a piston mounted on the piston rod and positioned within the fluid chamber portion of the cylinder, and a pair of rod guides positioned on opposite ends of the fluid portion of the cylinder, where the piston rod extends through, and is supported by, both rod guides.

Likewise, it is within the scope of the present invention to provide a damping apparatus that includes a substantially hollow cylinder having a fluid chamber portion containing a damping fluid, a piston rod extending concentrically within the fluid chamber portion of the cylinder and axially slidable with respect to the cylinder, a piston mounted on the piston rod and positioned within the fluid chamber portion of the cylinder, a rod guide positioned on a first end of the fluid chamber portion of the cylinder so as to support the piston rod extending therethrough, and a secondary rod extending concentrically within the fluid chamber portion of the cylinder from a second end of the cylinder and including an axial channel slidably receiving the secondary rod.

In view of the above, it will be apparent that another aspect of the present invention is to provide a method for reducing forces exerted by the primary piston rod of the monotube damping apparatus comprising the steps of: (a) providing a secondary body within the fluid chamber portion of the cylinder, where the secondary body has a volume that takes up a portion of the volume for the damping fluid in the cylinder; and (b) as the piston moves within damping fluid chamber, decreasing the volume of the secondary body within the damping fluid chamber as the primary piston rod moves into the damping fluid chamber and increasing the volume of the secondary body within the damping fluid chamber as the primary piston rod moves out from the fluid chamber portion of the cylinder. In the first embodiment, as described above, this method is accomplished by supporting the piston rod on a pair of rod guides, where the piston is mounted on the piston rod (in the damping fluid chamber) between the rod guides. If the portion of the piston rod extending from a first axial side of the piston is referred to as the primary rod and if the portion of the piston rod extending from the opposite axial side of the piston is referred to as the secondary body, then the volume of this secondary body in the damping fluid will decrease as the primary piston rod lengthens into the damping fluid. In the second embodiment, as described above, this method is accomplished by supporting the piston rod on a single rod guide on one end of the cylinder and providing a secondary rod extending from the other end of the cylinder, where the secondary rod is slidingly received concentrically within the piston. Accordingly, as the piston rod extends into the damping fluid chamber, the piston will slide over the secondary rod to an equal extent, thus decreasing the volume that the secondary rod takes up in the damping fluid chamber to the same extend that the volume of the piston rod within the damping fluid chamber is increasing.

Accordingly, it is an object of the present invention to provide a monotube-type damping assembly that substantially eliminates the contact between the piston and the interior surfaces of the damping cylinder. It is also an object of the present invention to provide a monotube-type damping assembly in which the available volume within the damping cylinder remains substantially constant. It is also an object of the present invention to provide an MR damping assembly that simplifies the electrical connections with the solenoid, that reduces the need for complex valves and seals within the piston, and that isolates the solenoid from the MR fluid. These and other objects and advantages of the present invention will be apparent from the following description, the attached drawings and the appended claims.

BRIEF DESCRIPTION DRAWINGS

FIG. 1A is a side elevational view of a first embodiment of the present invention, represented a vehicle steering damper;

FIG. 1B is a cross-sectional view of the embodiment of FIG. 1A taken along lines 1B—1B of FIG. 1A;

FIG. 2A is a side elevational view of a second embodiment of the present invention, represented as a vehicle engine damper;

FIG. 2B is a cross-sectional view of the embodiment of FIG. 2A taken along lines 2B—2B of FIG. 2A;

FIG. 2C is a perspective view of the embodiment of FIGS. 2A and 2B;

FIG. 3A is a side elevational view of a third embodiment of the present invention, represented as an engine damper, body/cab damper, steering damper or suspension damper;

FIG. 3B is an axial, cross-sectional view of the embodiment of FIG. 3A taken along lines 3B—3B of FIG. 3A;

DESCRIPTION OF THE PREFERRED EMBODIMENTS

Figure 3C:
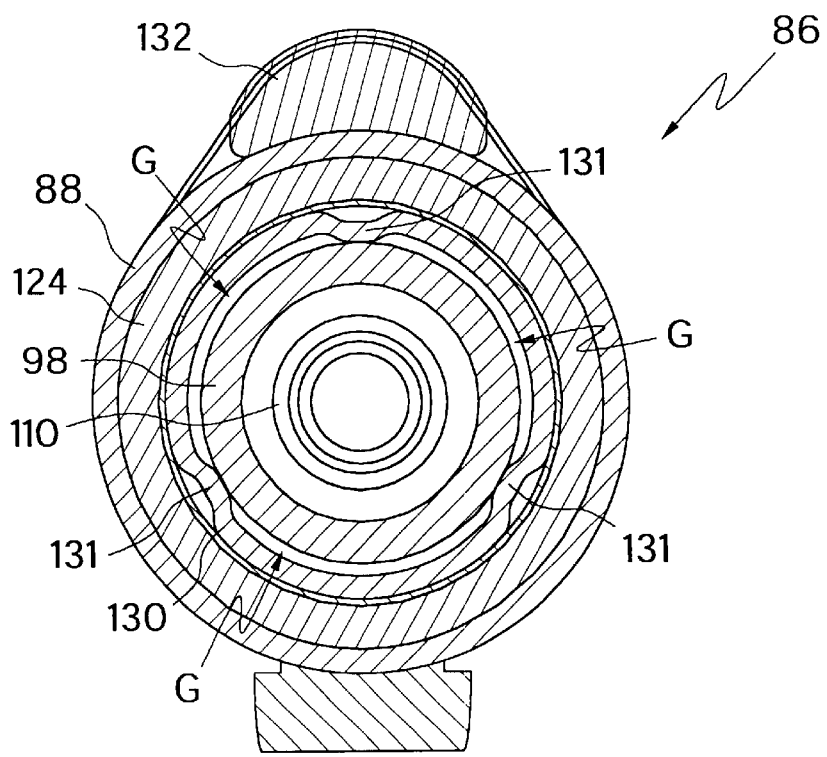
FIG. 3C is a radial cross-sectional view of the embodiment of FIGS. 3A and 3B taken along lines 3C—3C of FIG. 3B.

The present invention provides a magneto-rheological controlled damping assembly that substantially eliminates contact between the piston and the damping cylinder and that maintains a constant volume for the magneto-rheological fluid within the damping cylinder, thereby substantially reducing abrasion and wear to the damping apparatus components and increasing the performance and the life of the damping apparatus. While the damping assemblies of the present invention are preferably used as vehicle shock absorbers, body dampers, cab dampers, engine dampers, steering dampers and the like; it is within the scope of the invention to utilize the damping assemblies of the present invention in non-vehicle applications as well.

As shown in FIGS. 1A and 1B, a first embodiment of the present invention is a damping assembly, such as a steering damper 10, having a substantially hollow, cylindrical housing 12 with a fastening eyelet 14 extending from a first end of the housing and a piston rod 16 extending from an opposite end of the housing, where the piston rod also includes a fastening eyelet 18 extending therefrom. As will be apparent to those of ordinary skill in the art, the eyelets 14, 18 are used to attached the damping assembly 10 to a pair of vehicle components so as to dampen vibrations between the two vehicle components, where such vibrations are typically caused during vehicle operation.

As shown in FIG. 1B, the piston rod 16 is coaxially supported within the cylindrical housing 12 by a pair of rod guides 20, 22. A piston 24 is mounted onto a portion of the piston rod 16 and positioned between the rod guides 20, 22. The rod guides 20, 22 also enclose a chamber 26 therebetween for containing magneto-rheological fluid (the "MR chamber"). Magneto-rheological fluid ("MR fluid") is a type of fluid that changes viscosity in the presence of a magnetic field. Typically, MR fluids contain fine iron-powder or fine iron-alloy particles suspended in a liquid base, such as mineral oil or silicone. The suspension of such ferromagnetic particles in the fluid medium is known to affect the rheology of the medium when subjected to a magnetic flux. The viscosity, and other flow characteristics of the MR fluid, can change by several orders of magnitude when subjected to a magnetic field of sufficient strength. Furthermore, the MR fluid also preferably has one or more additives that prevent the iron from separating out from the liquid base.

The inner rod guide 20 separates the MR chamber 26 from an expansion chamber 28, and is slidably mounted within the cylindrical housing 12. A spring 30 is mounted within the expansion chamber 28 between an end cap 32 carrying the fastening eyelet 14 and the rod guide 20. The expansion chamber 28 allows the MR fluid within the MR chamber 26 to expand and contract in response to certain environmental conditions (such as heating and/or cooling of the MR fluid). The spring 30 biases inwardly against the rod guide 20 and acts to maintain a relatively constant pressure within the MR chamber 26. An O-ring seal 34 is circumferentially positioned on the rod guide 20, radially between the rod guide 20 and the inner wall of the cylindrical housing 12. Also, a wiper seal 36 is carried in the hub of the rod guide and acts to prevent the MR fluid from leaking through the hub of the rod guide and into the expansion chamber 28.

The opposing rod guide 22 is fixedly mounted to the end of the cylinder housing opposite the end cap 32. This rod guide 22 also includes a wiper seal 38 carried on the hub so as to prevent the leakage of the MR fluid from the MR chamber 26 into the environment.

The rod guides 20, 22 support the piston rod 16 and attached piston 24 coaxially within the MR chamber 26 so that the piston 24 is prevented from contacting the inner surfaces of the chamber 26, thereby avoiding abrasions and other degradation to the damping apparatus components. Furthermore, because the rod 16 extends completely through both rod guides 20, 22 and the MR chamber 26, the volume for the MR fluid within the MR chamber remains relatively constant as the piston moves back and forth therein. That is, the volume taken up by the piston and piston rod within the MR chamber does not appreciably change. Therefore, the force exerted by spring 30 will not impart forces onto the rod 16.

Inner sleeves 40, 41 of substantially non-magnetic material (such as, for example, stainless steel, aluminum or plastic) are optionally positioned in the MR chamber 26 and line the inner circumferential housing 12. A third inner sleeve 43, of substantially non-magnetic material (such as, for example, stainless steel, aluminum or plastic) is positioned axially between the inner sleeves 40, 41. These sleeves, if present, control the magnetic flux paths and displace fluid (to reduce cost). The inner diameter of the sleeves 40, 41 & 43 is slightly larger than the outer diameter of the piston 24, thereby forming a small annular gap between the sleeves 40, 41 & 43 and the cylinder 24 through which the magneto-rheological fluid can pass when the piston moves axially within the MR chamber 26. Because this gap is very small the volume of magneto-rheological fluid that is permitted to flow through the gap at any given time is limited, thereby acting to dampen the axial motion of the piston within the chamber 26. An electric coil or solenoid 42 having a current source 44 is mounted circumferentially around the inner sleeve 40, and is selectively energized to create a magnetic field in the gap between the piston 24 and the sleeve 40, where the selective energization of solenoid 42 controls the viscosity of the magneto-rheological fluid in the gap, thereby controlling the damping characteristics of the mechanism 10.

A pair of annular rings 46, 48 of magnetically soft material are positioned on opposite axial sides of the solenoid 42 and have respective annular projections 50, 52 extending through annular gaps in the sleeve 40. Surrounding the solenoid 42 and the annular rings 46, 48 is a cylindrical cap 54 of magnetically soft material. Preferably, the current source (such as leads 44) extends radially through this cylindrical cap 54. The piston 24 is made from a magnetically soft material such as mild steel. Accordingly, when the solenoid 42 is energized, a magnetic circuit is provided that extends through the first annular ring 46, through the annular gap between sleeves 41 and 43, through the radial gap between annular projection 50 of annular ring 46 and the piston 24, into the piston 24, back through the radial gap between piston 24 and projection 52 of annular ring 48, through annular ring 48, through the cylinder cap 54 and back through annular ring 46. This magnetic circuit as shown by arrow M.

Preferably, the piston rod 16 and inner sleeve are made from non-magnetic materials so as to assist in the formation and shaping of the magnetic circuit M. Because the non-magnetic inner sleeve 40 is used, the cylindrical housing 12 may be formed from a magnetically soft material, which is generally cheaper and more readily available than the non-magnetic material for the inner sleeve 40.

Preferably, a computerized control system is operatively coupled to the current supply 44 and is configured to vary the current supplied to the solenoid 42 in accordance with the desired damping characteristic.

As shown in FIGS. 2A–2C, a second embodiment of the present invention is a damping assembly, such as an engine damper 56, which includes a non-magnetic cylindrical housing 58 and a pair of rod guides 60, 62 coaxially supporting a non-magnetic piston rod 64 and an associated magnetically-soft piston 66 for axial movement within the cylindrical housing 58. The rod guides 60, 62 enclose a chamber 68 containing the MR fluid. The rod guide 62 is preferably axially slidable within the cylindrical housing 58 and separates the MR chamber 68 from an expansion chamber 70. Positioned within the expansion chamber 70 is a spring 72 that biases the rod guide 62 towards the MR chamber 68. The expansion chamber allows the MR fluid within the MR chamber 68 to expand and contract in response to hot or cold conditions.

A solenoid 74 circumferentially surrounds the cylindrical housing 58; and a pair of magnetically-soft rings 76, 78 are axially juxtaposed with the solenoid. Each of the rings 76, 78 includes a respective annular projection 80, 82 extending into an annular opening in the cylindrical housing 58. The solenoid 74 is operatively coupled to a current supply 84. Thus, when the solenoid is energized, a magnetic circuit is provided which extends through one of the magnetically soft rings 78, into the annular projection 82 positioned in the annular opening in the cylindrical housing, through the radial gap positioned between the cylindrical housing 58 and the piston 66, into the piston 66 back through the radial gap between the piston 66 and the cylindrical housing 58, into the projection 80 positioned in the annular opening in the cylindrical housing 58, through the second one of the magnetically-soft ring 76, through magnetically soft cover 75 and back into ring 78. This magnetic circuit is shown by arrows M'.

As with the first embodiment described in FIGS. 1A and 1B, a computerized control system may be operatively coupled to the current supply 84 and is configured to vary the current supplied to the solenoid 74 in accordance with the desired damping characteristic.

As shown in FIGS. 3A–3D, a third embodiment of the present invention is a damping assembly, such as an engine damper 86, having a substantially hollow, cylindrical housing 88 with a fastening eyelet 90 extending from a first end of the housing and a piston rod 92 extending from an opposite end of the housing, where the piston rod 92 includes a fastening eyelet 94 extending therefrom. As will be apparent to those of ordinary skill in the art, the eyelets 90, 94 are used to attach the damping assembly 86 to a pair of vehicle components so as to dampen vibrations between the two vehicle components.

As shown in FIG. 3B, a rod guide 96 coaxially supports the piston rod 92 within the cylindrical housing 88. A piston 98 is mounted to an end portion of the piston rod 92 extending into a chamber 100 within the cylindrical housing 88, which contains MR fluid. A disc 102 positioned within the cylindrical housing 88, distal from the rod guide 96, separates the MR chamber 100 from a compensation chamber 104. The compensation chamber 104 contains a pressurized gas used to compensate for fill variations and/or thermal expansion of the MR fluid within the MR chamber 100, and is useful for maintaining a constant pressure for the MR fluid within the MR chamber 100. The disc 102 includes a 0-ring 106 positioned concentrically thereabout, radially between the disc 102 and an inner surface of the cylinder so as to seal the compensation chamber 104 from the MR chamber 100. A wiper seal 108 is carried in the hub of the rod guide 96 and acts to prevent the MR fluid from leaking through the hub of the rod guide and into the environment.

A secondary rod 110 extends concentrically from the disc 102 into the MR chamber 100 and is concentrically received by a channel 112 extending into the piston head 98. Preferably, the secondary rod 110 has the same diameter as the piston rod 92. Therefore, as the primary piston rod 92 moves into and out of the MR chamber 100, the secondary rod 110 will be caused to move into and out of the piston head 98 to the same extent, thus assuring that the volume for the MR fluid within the MR chamber 100 will remain substantially constant. The secondary rod 110 also provides a concentric support for the piston head 98.

Preferably, the piston head includes a gas-filled inner chamber 114, and the secondary rod 110 includes a hollow channel 116 extending therein that is in fluid communication with the inner chamber 114 of the piston head 98. By hollowing out the secondary rod 110 in such a way, the displacement of gases within the chamber 114 as the secondary rod slides into and out of the chamber 114 is minimized. Optionally, a vent 118 may be provided that extends axially through the piston rod 92 and opening into the inner chamber 114 so as to provide fluid communication between the inner chamber 114 and the atmosphere. This vent 118 will allow the secondary rod 110 to move back and forth freely within the chamber 114, without significantly adding to or decreasing the pressure within the chamber 114. A wiper seal 119 is positioned in the channel 112 to seal the MR chamber 100 from the inner chamber 114 of the piston head 98.

Figure 3D:
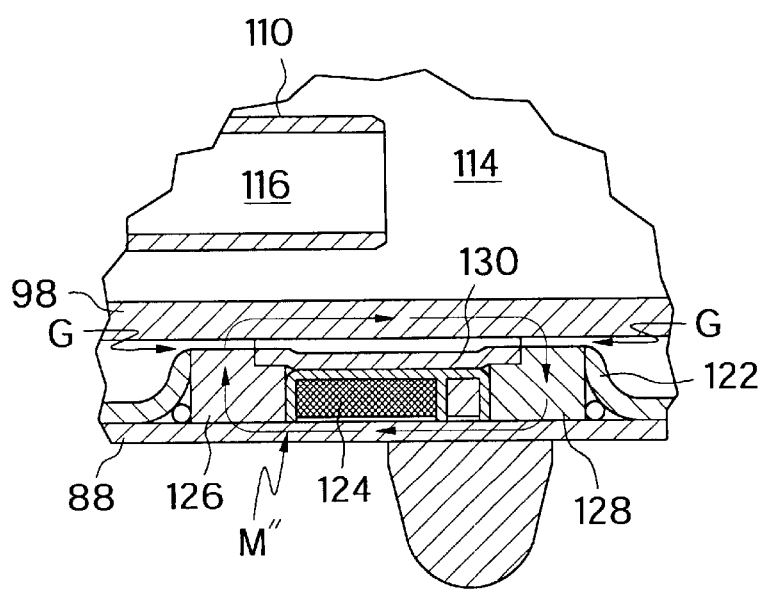
FIG. 3D is view of the area indicated by phantom line 3D in FIG. 3B.

Referring to FIGS. 3B–3D, an inner cylindrical sleeve 120 of substantially non-magnetic material (such as, for example, stainless steel, aluminum or plastic) is positioned within the cylindrical housing 88 and lines the inner circumferential surface of the cylindrical housing. The cylindrical sleeve 120 includes an armular depression 122 in axial alignment with the piston head 98 for positioning a solenoid 124 and a pair of magnetically soft, annular pole pieces 126, 128 therein. An annular, non-magnetic spacer 130 is mounted to the pole pieces 126, 128 radially between the solenoid 124 and the piston head 98. The spacer is provided with a plurality of radially inwardly extending depressions 131 to center the piston head 98 within the MR chamber 100, and includes at least one, and preferably a plurality of axially extending gaps G (see FIGS. 3C and 3D) between the depressions 131 that permit the MR fluid to travel axially therethrough as the piston head 98 moves back and forth within the MR chamber 100. Because such axially extending gaps G are very small, the volume of MR fluid that is permitted to flow through the fluid paths provided by these gaps at any given time is limited, thereby acting to dampen the axial motion of the piston head 98 within the MR chamber 100. The solenoid 124 is operatively coupled to an electrical connector 132, providing a current source, and is thus selectively energized to create a magnetic field in the fluid paths provided radially between the piston head 98 and the pole pieces 126 and 128. Selectively energizing the solenoid 124 controls the viscosity of the MR fluid in the fluid paths provided by the axially extending gaps between the pole pieces 126 and 128 and the piston head 98, thereby controlling the damping characteristics of the damping assembly 86.

The pole pieces 126, 128 are made of a magnetically soft material and are positioned on opposite axial sides of the solenoid 124 within the recess 122 and have annular projections 134, 136 extending into annular gaps between the sleeve 120 and the spacer 130. When the solenoid 124 is energized, a magnetic circuit is provided through the first annular pole piece 128, through the axially extending fluid path between the pole piece 128 and the piston head 98, into the piston head 98, back through the axially extending fluid path between the pole piece 126 and the piston head 98, through the pole piece 126, through housing 88 and back into pole piece 128. This magnetic circuit is shown by arrow M" (See FIG. 3D).

The piston head 98 is made from a magnetically soft material, similar or identical to that of the pole pieces 126, 128. As discussed above, the sleeve 120 is preferably formed from a non-magnetic material, which is used to control the direction and shape of the magnetic flux circuit M". Because the non-magnetic inner sleeve 120 is used, the cylindrical housing 88 may be formed from a magnetically soft material, which is generally cheaper and more regularly available than the non-magnetic material for the inner sleeve 120.

Preferably, as with the embodiments discussed above, a computerized control system may be operatively coupled to the current supply and configured to vary the electric current supplied to the solenoid 124 in accordance with a desired damping characteristic.

In light of the above description with respect to the preferred embodiments, it will be apparent to those of ordinary skill that it is within the scope of the invention to provide a method for reducing forces exerted by a primary piston rod of a monotube damping apparatus that includes the steps of: a) providing a secondary body within the fluid chamber portion of the cylinder, where the secondary body has a volume that takes up a portion of the volume for the damping fluid within the cylinder; and b) decreasing the volume of the secondary body within the damping fluid chamber as the primary piston rod moves into the damping fluid chamber and increasing the volume of the secondary body within the damping fluid chamber as the primary piston rod moves out from the fluid chamber portion of the cylinder. With the embodiment shown in FIGS. 1A and 1B, the "primary piston rod" with respect to the above method is the portion of the piston rod 16 extending axially from the piston head 24 through the rod guide 22 and the "secondary body" is the portion of the piston rod 16 extending axially from the piston head 24 through the rod guide 20. As discussed above, as this primary portion of the piston rod 16 oscillates into and out of the MR chamber 26, the secondary portion of the piston rod 16 will oscillate out of and into the MR chamber 26, respectively, to an equal extent.

With the embodiment shown in FIGS. 3A and 3B, the primary piston rod with respect to the above method is the piston rod 92 and the secondary body is the secondary rod 110. Therefore, with this embodiment, as the primary piston rod 92 oscillates into and out from the MR chamber 100, the secondary piston rod 110 will oscillate into and out of the piston head 98 to an equal extent, thus maintaining a substantially constant volume for the MR fluid within the MR chamber 100. Of course, it will be apparent to those of ordinary skill in the art that the present method may be accomplished by other forms of apparatus not explicitly described herein, all of such methods being within the scope of the present invention.

What is claimed is:

1. A magneto-rheological damping apparatus comprising:
   a cylinder, having an MR fluid chamber portion containing a magneto-rheological fluid therein;
   a piston rod extending concentrically within the MR fluid chamber portion of the cylinder, the piston rod being axially slidable with respect to the cylinder;
   a piston mounted on the piston rod and positioned within the MR fluid chamber portion of the cylinder, the piston having an outer diameter that is smaller than an inner diameter of the MR fluid chamber portion of the cylinder so as to form a radial gap between the piston and the MR fluid chamber portion of the cylinder, the radial gap providing a flow path for the magneto-rheological fluid;
   a solenoid, operatively coupled to a current supply, mounted around the cylinder, outside of the MR fluid chamber portion of the cylinder, for generating a magnetic flux in the radial gap, thereby increasing viscosity of the magneto-rheological fluid in the flow path;
   a pair of rod guides positioned on opposite ends of the MR fluid portion of the cylinder, the piston rod extending through and being supported by both rod guides, a first one of the pair of rod guides being slidably positioned within the cylinder between the MR fluid chamber portion and an expansion portion of the cylinder and having a substantially fluid-tight seal with the inner circumferential surface of the cylinder to separate the MR fluid chamber portion of the cylinder from the expansion portion of the cylinder, and
   a spring positioned within the expansion portion of the cylinder and abutting the first one of the pair of rod guides so as to urge the first one of the pair of rod guides inwardly towards the MR fluid chamber portion of the cylinder.

2. A magneto-rheological damping apparatus comprising:
   a cylinder, having an MR fluid chamber portion containing a magneto-rheological fluid therein;
   a piston rod extending concentrically within the MR fluid chamber portion of the cylinder, the piston rod being axially slidable with respect to the cylinder;
   a piston mounted on the piston rod and positioned within the MR fluid chamber portion of the cylinder, the piston having an outer diameter that is smaller than an inner diameter of the MR fluid chamber portion of the cylinder so as to form a radial gap between the piston and the MR fluid chamber portion of the cylinder, the radial gap providing a flow path for the magneto-rheological fluid;

a solenoid, operatively coupled to a current supply, mounted around the cylinder, outside of the MR fluid chamber portion of the cylinder, for generating a magnetic flux in the radial gap, thereby increasing viscosity of the magneto-rheological fluid in the flow path;

a pair of annular rings of a magnetically soft material juxtaposed on opposite axial sides of the solenoid; and a substantially magnetically soft, cylindrical cap surrounding the solenoid and pair of annular rings, wherein the piston is formed from a magnetically soft material; wherein the MR fluid chamber portion of the cylinder is formed from a non-magnetic material and includes a pair of annular openings, each of the annular openings being axially aligned with a corresponding one of the annular rings of magnetically soft material, and wherein a magnetic circuit is provided from the solenoid, through a first one of the annular rings, through the annular opening axially aligned with the first one of the annular rings, through the radial gap, through the piston, back through the radial gap, through the annular opening axially aligned with a second one of the annular rings, through the second one of the annular rings, through the cylindrical cap and back into the first one of the annular rings.

3. The magneto-rheological damping apparatus of claim 2, wherein each of the pair of annular rings includes a portion extending into the annular opening axially aligned therewith.

\* \* \* \* \*